United States Patent
Kraft

(10) Patent No.: US 6,535,229 B1
(45) Date of Patent: Mar. 18, 2003

(54) GRAPHICAL USER INTERFACE FOR SELECTION OF OPTIONS WITHIN MUTUALLY EXCLUSIVE SUBSETS

(75) Inventor: Reiner Kraft, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/342,790

(22) Filed: Jun. 29, 1999

(51) Int. Cl.$^7$ ................................................. G09G 5/00
(52) U.S. Cl. ........................ 345/764; 345/810; 345/835; 345/841; 345/845; 345/771
(58) Field of Search ................................. 345/764, 810, 345/835, 841, 845, 773, 771, 809, 840, 469, 345

(56) References Cited

U.S. PATENT DOCUMENTS

| | | | |
|---|---|---|---|
| 4,931,783 A | 6/1990 | Atkinson | 340/710 |
| 5,202,828 A | 4/1993 | Vertelney et al. | 364/419 |
| 5,347,627 A | 9/1994 | Hoffman et al | 395/157 |
| 5,619,708 A | 4/1997 | Ho | 395/767 |
| 5,623,592 A * | 4/1997 | Carlson et al. | 395/348 |
| 5,706,449 A | 1/1998 | Liu et al. | 395/326 |
| 5,724,573 A * | 3/1998 | Agrawal et al. | 395/606 |
| 5,815,595 A | 9/1998 | Gugler | 382/173 |
| 5,826,051 A * | 10/1998 | Porter et al. | 345/345 |
| 5,844,554 A | 12/1998 | Geller et al. | 345/333 |
| 5,845,122 A | 12/1998 | Nielsen et al. | 395/354 |
| 6,243,088 B1 * | 6/2001 | McCormack et al. | 345/333 |
| 6,266,060 B1 * | 7/2001 | Roth | 345/356 |

OTHER PUBLICATIONS

Wilber o. Galitz, The Essential Guide To User Interface Design, John Wiley & Sons, Inc, 1997.*
Ron Person, Robert Voss, et al., Using Microsoft Windows 95, Que Corporation, 1997.*

* cited by examiner

Primary Examiner—Kristine Kincaid
Assistant Examiner—Mylinh Tran
(74) Attorney, Agent, or Firm—Lumen Intellectual Property Services, Inc.

(57) ABSTRACT

An intuitive and easy-to-use virtual control for a computer graphical user interface (GUI) automatically ensures the self-consistency of user-selected items in a list of selectable items. A GUI control presents a set of selectable options to a user and allows the user to select items from the set of options. The set of selectable items is partitioned into subsets. Items within any one subset may be selected or de-selected independent of each other, while items in different subsets may have interdependent settings. The selection of any item in one subset forces all items in all other subsets to be de-selected, so that the selection of items in distinct subsets are mutually exclusive. More general interdependencies can also be enforced between items in distinct subsets. The GUI control thus ensures the self-consistency of information in cases where conventional radio button and check box GUI controls are inadequate.

6 Claims, 8 Drawing Sheets

FIG. 1 PRIOR ART

Options:
- ☒ Air Conditioning
- ☒ Sun Roof
- ☐ Electric Windows
- ☐ Cruise Control
- ☒ ABS

FIG. 2 PRIOR ART

Body Color:
- ● Red
- ○ Blue
- ○ Green
- ○ Silver
- ○ Gold

FIG. 3 PRIOR ART

30 — Transmission:
- ● Automatic
- ○ Manual

32 — Automatic Options:
- ☒ 5th gear

34 — Manual Options:
- ☐ Very Low gear
- ☒ 5th gear
- ☐ 4WD

FIG. 4 PRIOR ART

Transmission:

- ● Automatic
- ○ Auto. + 5th gear
- ○ Manual
- ○ Manual + 5th gear
- ○ Manual + VL gear
- ○ Manual + 4WD
- ○ Manual +VL gear +4WD
- ○ Manual +VL gear +5th gear
- ○ Manual +4WD +5th gear
- ○ Manual +VL gear +4WD +5th gear

PRIOR ART
FIG. 5

Database(s):
- ☒ US
- ☐ JP
- ☒ EP
- ☐ PCT
- ☐ INSPEC

PRIOR ART
FIG. 6

Database(s):
- ☒ US
- ☐ JP
- ☒ EP
- ☐ PCT
- ☐ INSPEC
- ☒ All of the above

FIG. 7 PRIOR ART

Database(s):

US, EP, INSPEC

Choices: US, JP, EP, PCT, INSPEC, ALL

FIG. 8 PRIOR ART

Database(s):

- ◉ US
- ○ JP
- ○ EP
- ○ PCT
- ○ INSPEC
- ○ US, JP
- ○ US, EP
- ○ US, PCT
- ○ US, INSPEC
- ○ JP, EP
- ○ JP, PCT
- ○ JP, INSPEC
- ○ EP, PCT
- ○ EP, INSPEC
- ○ PCT, INSPEC
- ○ US, JP, EP
- ○ US, JP, PCT
- ○ US, JP, INSPEC
- ○ US, EP, PCT
- ○ US, EP, INSPEC
- ○ US, PCT, INSPEC
- ○ JP, EP, PCT
- ○ JP, EP, INSPEC
- ○ JP, PCT, INSPEC
- ○ EP, PCT, INSPEC
- ○ US, JP, EP, PCT, INSPEC

FIG. 9

Transmission:
- 90 ☐ Automatic
- 92 ☐ Auto. + 5th gear
- 94 ☐ Manual
- 96 ☒ Manual + 5th gear
- ☒ Manual + VL gear
- ☐ Manual + 4WD

FIG. 10

Transmission:
- 100 ○ Automatic
  - ☐ 5th gear
- ⦿ Manual
  - 102 ☒ 5th gear
  - ☐ VL gear
  - ☐ 4WD

FIG. 11

Database(s):

- ☒ US Patents
- ☐ Japanese Patents
- ☒ European Patents
- ☐ PCT Patent Publications
- ☐ All of the above 110
112

FIG. 12

Database(s):

- ☒ US Patents
- ☐ Japanese Patents
- ☒ European Patents
- ☐ PCT Patent Publications
- ☐ All but PCT 120
122

GRAPHICAL USER INTERFACE FOR SELECTION OF OPTIONS WITHIN MUTUALLY EXCLUSIVE SUBSETS

FIELD OF THE INVENTION

The present invention relates to graphical user interfaces in computer systems. More specifically, it relates to graphical user interface controls for allowing users to correctly and easily select from among multiple exclusive and non-exclusive options.

BACKGROUND OF THE INVENTION

Computer user interfaces enable users of a computer system to communicate with the computer system. A graphical user interface (GUI) is a common type of user interface that displays graphical objects to the user and allow the user to interact with these objects, typically using a pointing device such as a mouse. A GUI normally includes virtual controls that allow users to select or enter information. Different types of virtual controls are designed to display and receive different types of information. For example, the simplest type of GUI control is a button. Buttons are displayed objects (such as a rectangle with "SAVE" inside), which can be activated. When the user selects the button with a pointing device, the computer performs a specified action. Other common GUI controls are text boxes, pull-down menus, check box lists and radio button lists.

A typical check box list is shown in FIG. 1. In this example, the check boxes are being used to allow the user to select automobile options. The options in this particular example are air conditioning, sunroof, electric windows, cruise control, and automatic braking system (ABS).

Each item in a check box list includes a text descriptor (e.g., "Air Conditioning" 10) and a binary state check box (e.g., box 12), which can be selected or de-selected by the user. When the user positions the pointing device on a particular check box and clicks, the box toggles between a selected state, displayed as a box with an "X" in it (e.g., box 12), and a de-selected state, displayed as an empty box (e.g., box 14). As shown in the figure, multiple boxes in the check box list can be simultaneously selected by the user, and each box can be selected or de-selected independent of the states of the other boxes. Check box lists are thus appropriate GUI controls for allowing a user to make binary specifications of multiple mutually independent items. For example, check boxes are appropriate controls for selecting these automobile options because any number of options may be selected in various combinations, and the options are typically selected independent of each other.

Another common type of GUI control is the radio button list. A typical radio button list is shown in FIG. 2. In this particular example, the list is used to select one automobile color from among the list including red, blue, green, silver, and gold. Each item in a radio button list includes a text descriptor (e.g., "Red" 20) and a binary state circular button (e.g., button 22), which can be selected or de-selected by the user. When the user positions the pointing device on a particular circular button and clicks, the button toggles between a selected state, displayed as a circle with a solid dot in it (e.g., button 22), and a de-selected state, displayed as an empty circle (e.g., button 24). In contrast with the check boxes, however, only one radio button in a radio button list can be selected at any given time. In other words, if a user selects one radio button, all other buttons in the list are automatically de-selected. Thus, the states of the radio buttons are interdependent. Radio button lists are thus appropriate GUI controls for allowing a user to select a single item from among multiple mutually exclusive items. For example, radio buttons are appropriate controls for selecting the color of an automobile because cars are normally painted just one color, exclusive of all other possible colors.

Although check box lists and radio button lists are appropriate GUI controls for many situations, in certain cases these controls are awkward, inconvenient, confusing, ambiguous, or simply incorrect. For example, consider a specific case in which GUI controls are needed to allow a user to select among various transmission options for a particular automobile that is manufactured with either an automatic transmission or a manual transmission. In the case of the automatic transmission, the manufacturer allows the buyer to select the option of a 5th gear. In the case of the manual transmission, the manufacturer allows the buyer to select any combination of three options: a 5th gear, a very low (VL) gear, and 4-wheel drive (4WD). Thus, the GUI should allow the user to select between automatic and manual transmissions, and to select the various options associated with each of these two transmissions.

One possible GUI design for this situation is shown in FIG. 3. This design includes three controls: a radio button control 30 that allows the user to select between the mutually exclusive options of automatic and manual transmissions, a first check box list 32 that allows the user to select or de-select the 5th gear option for the automatic transmission, and a second check box list 34 that allows the user to independently select or de-select each of the three options for the manual transmission. Although this intuitive GUI design might appear at first to be adequate, upon closer to examination it becomes evident that this GUI design is seriously flawed because it allows the user to enter ambiguous and contradictory information. In particular, observe that the user can select the automatic transmission option in radio button list 30, while at the same time selecting various manual transmission options in checklist 34. In addition, this GUI design also allows the user to select the manual transmission option in radio button list 30, while at the same time selecting the automatic transmission option in checklist 32. This GUI design, therefore, is not appropriate for this situation because it permits the user to enter inconsistent information that cannot be unambiguously interpreted by the computer.

The problems associated with the GUI design shown in FIG. 3 can be overcome using the GUI design shown in FIG. 4. This design consists of a single radio button list whose items correspond to mutually exclusive combinations of options. Because the listed items are constructed to correspond to only the self-consistent and unambiguous combinations of options, and because the user is constrained to select just one of the items in the radio button list, the user input is consistent and unambiguous. This GUI design, however, suffers from the disadvantage that it is both difficult to create and hard to use. Because the radio button items are all mutually exclusive, the GUI designer must engage in the laborious and error-prone task of constructing an accurate and exhaustive list of all the self-consistent combinations of options. In addition, this exhaustive list of all possible combinations is not an intuitive or easy-to-use GUI control for the user. The problem becomes extreme when the number of options exceeds five, since the list of all possible combinations of options might fill an entire display screen. Thus, the standard GUI controls force the GUI design to be either inconsistent and ambiguous, or non-intuitive and difficult to use.

Even in situations where the standard GUI controls do not suffer from the problems just described, they are sometimes inconvenient or cumbersome to use. For example, consider a database searching an application that requires a GUI to allow a user to specify a combination of databases for searching. Suppose that there are five databases from which to select: United States patents (US), Japanese patents (JP), European patents (EP), Patent Cooperation Treaty publications (PCT), and scientific journal article abstracts (INSPEC). The appropriate GUI control for this situation is a five-item check box list, as shown in FIG. 5. Although both intuitive and consistent, this GUI design can be inconvenient to the user who repeatedly desires to select all of the options. Each time such a user is presented with the check box list shown in FIG. 5, all the items must be selected. The problem for this particular user might be overcome by configuring the check boxes so that they are all initially checked rather than empty; but this solution poses a problem for another user who repeatedly desires to search just a single database and must de-select all the other boxes every time the GUI control is used. Another attempt to solve this problem might be to add an "All of the above" item to the list, as shown in FIG. 6. This approach, however, creates a GUI that permits the user to enter inconsistent and ambiguous information. For example, the user can check the "All of the above" box, while some of the other boxes are checked and some are not checked. Such inconsistent information cannot be unambiguously interpreted by the computer. A similar problem is encountered when a text box control is used for input, as shown in FIG. 7. Because the user is free to type any text into the box, there is no guarantee that the text will be consistent or unambiguous. Using conventional GUI controls, these problems can be avoided only by using a radio button list that contains all the possible combinations of databases, as shown in FIG. 8. Using this radio button list, the user can select all the databases, or any particular subset of databases, with just a single click. Because the list of all possible combinations is very long, however, it is difficult for the user to find the desired selection within the complicated list of combinations.

It is evident, therefore, that the conventional GUI controls are often difficult to design and use, or allow the user to provide ambiguous and inconsistent information to the computer.

SUMMARY OF THE INVENTION

In view of the above, it is a primary object of the present invention to provide a new virtual control for a GUI that overcomes the problems with conventional GUI controls. More specifically, it is an object of the present invention to provide a new type of item list GUI control that is both easy to use and design, and controls the self-consistency of the items selected in the list. A GUI control according to the present invention presents a set of selectable options to a user and allows the user to select items from the set of options, wherein some of the options in the set have settings that are mutually exclusive with respect to settings of other options in the set, while other items in the set of options have settings that are not mutually exclusive with respect to settings of other options in the set. In a preferred embodiment of the invention, a GUI control comprises a set of selectable items, wherein the set is partitioned into subsets. Items within any one subset may be selected or deselected independent of each other, while the subsets themselves are mutually exclusive, i.e., the selection of one or more items in one subset forces all items in all other subsets to be de-selected. More generally, in an alternate embodiment of the present invention, a GUI control presents a set of selectable items to a user, where the set contains two subsets A and B. The user is allowed to interact with the control to select or de-select individual items in the set. As any item in the list is selected or de-selected, other items in the list are automatically selected or de-selected to ensure that any selection of items in subset A other than a first predetermined combination, is exclusive of any selection of items in subset B other than a second predetermined combination. The present invention provides a GUI control that is intuitive, easy to use, easy to design, and enforces the entry of self-consistent information. These and other advantages of the invention will become apparent from a consideration of the following detailed description and associated drawings.

DESCRIPTION OF THE DRAWINGS

FIG. 1 illustrates a check box GUI control, as is known in the art.

FIG. 2 illustrates a radio button GUI control, as is known in the art.

FIG. 3 illustrates a GUI design using of a combination of radio button and check box GUI controls.

FIG. 4 illustrates a GUI design using a single radio button list containing all possible selfconsistent combinations of options.

FIG. 5 illustrates a check box GUI control, as is known in the art.

FIG. 6 illustrates an alternative check box GUI control, including an "All of the above" item.

FIG. 7 illustrates a text box GUI control, as is known in the art.

FIG. 8 illustrates a radio button list GUI control containing a list of all possible self-consistent combinations of options.

FIG. 9 illustrates a GUI control according to a preferred embodiment of the present invention.

FIG. 10 illustrates a GUI control according to an alternate embodiment of the present invention.

FIG. 11 illustrates a GUI control according to a preferred embodiment of the present invention.

FIG. 12 illustrates a GUI control according to an alternate embodiment of the present invention.

DESCRIPTION OF THE PREFERRED EMBODIMENT

Figure 13:
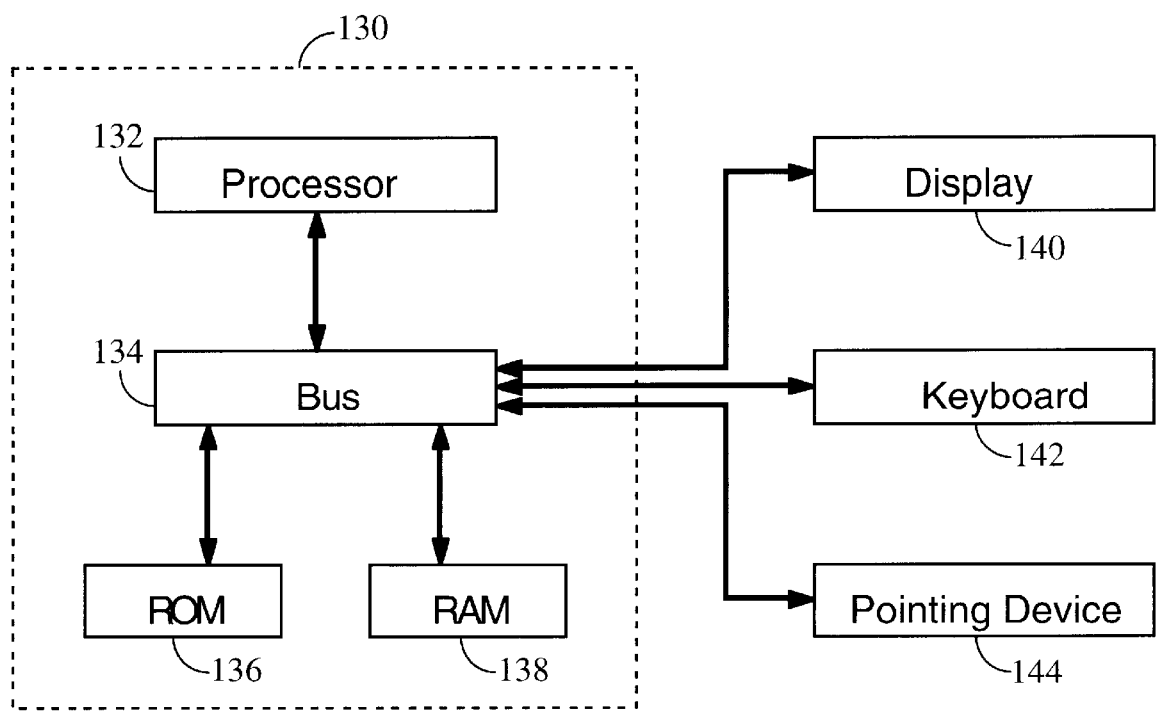
FIG. 13 is a block diagram of a computer system used to implement the techniques of the present invention.

The preferred embodiment of the present invention provides a method and system for providing improved controls in a graphical user interface. In contrast with a check box list, whose items are mutually independent, and a radio button list, whose items are mutually exclusive, a GUI control according to the present invention provides an item list control having features and functionality that cannot be attained by known controls, either alone or in mutual combination. More specifically, the GUI control of the present invention is a hybrid control that combines in a single list properties of both radio button lists and check box lists. This hybrid list provides the necessary functionality to overcome all the problems, disadvantages, and limitations of the radio button and check box type GUI controls.

An example of a hybrid list GUI control according to the present invention is illustrated in FIG. 9. This GUI control solves the problems discussed above in relation to FIG. 3 and FIG. 4. Recall that the collection of three controls shown in FIG. 3 permits the user to enter inconsistent and ambiguous information, while the control shown in FIG. 4 is confusing to design and use. The hybrid GUI control shown in FIG. 9, in contrast, allows the user to independently select various options within mutually exclusive subsets of the list. In particular, the list in this example allows the user to select from among the following transmission options: automatic, automatic with 5th gear, manual, manual with 5th gear, manual with very low gear, and manual with 4-wheel drive. These options are listed as separate items in the GUI control display, where each item includes a selection object (shown in this case as a check box) and a text descriptor. A unique feature of the present invention is that the items in the hybrid list are partitioned into subsets of items. In this example, the list is partitioned into four subsets, where a horizontal line indicates the partitioning. The first subset 90 contains the single item "Automatic". The second subset 92 contains a single item "Auto. +5th gear". The third subset 94 contains the single item "Manual". The fourth subset 96 contains three items: "Manual +5th gear", "Manual +VL gear", and "Manual +4WD". The hybrid list control permits the user to independently select any combination of the three items within subset 96. These three items, therefore, are not mutually exclusive with respect to each other. They are, however, mutually exclusive with respect to the items in the other subsets 90, 92, and 94. Thus, if the user selects one or more of the items in subset 96, then the items in subsets 90, 92, and 94 are all automatically de-selected, while other items within subset 96 are unaltered. Conversely, if the user selects any item within one of the subsets 90, 92, or 94, then all items in other subsets, including the three items in subset 96, are automatically de-selected. This hybrid GUI control, therefore, provides both an intuitive and easy-to-use interface that does not allow the user to enter inconsistent information.

The hybrid GUI control may be implemented in various ways. For example, FIG. 10 illustrates an alternate implementation of the control just described in relation to FIG. 9. The list contains the same items as those shown in FIG. 9, but with a slightly different organization and behavior. The two subsets associated with automatic transmission options are displayed together in a first group 100, while the two subsets associated with manual transmission options are displayed together in a second group 102. The first group 100 contains a first subset having one item, "Automatic", with a button selector, and a second subset having one item, "5th gear", with a check box selector. The second group 102 contains a first subset having one item, "Manual", with a button selector, and a second subset having three items, "5th gear", "VL gear", and "4WD", with check box selectors. The button selectors are mutually exclusive of each other, so that if the "Automatic" button in group 100 is selected, then the "Manual" button in group 102 is automatically de-selected, and vice versa. In addition, the button selectors in a group are automatically matched with the check boxes in that group, and are mutually exclusive of the check boxes in other groups. For example, if the "Automatic" button in the first group 100 is selected, then all three check boxes in the second group 102 are automatically de-selected. Similarly, if the "Manual" button in the second group 102 is selected, then the check box in the first group 100 is automatically de-selected. In addition, if one or more of the three check boxes in the second group 102 is selected by the user, then the "Manual" button in the second group 102 is automatically selected, and hence the "Automatic" button in the first group 100 is automatically de-selected along with the check box in the first group 100. Similarly, if the check box in the first group 100 is selected, then the "Automatic" button in the first group 100 is automatically selected, and hence the "Manual" button in the second group 102 is automatically de-selected along with all three check boxes in the second group 102. The three check boxes in the second group 102, however, may be selected or de-selected independent of each other. This alternate embodiment is useful for explicitly representing hierarchical relationships between subsets by displaying one subset with check boxes and another with buttons. The key feature shared by both embodiments is the provision for mutually independent subsets of items that are mutually exclusive with respect to items in other subsets. Whereas the embodiment shown in FIG. 10 is implemented with all subsets being mutually exclusive of each other, the alternate embodiment shown in FIG. 11 contains subsets (i.e., the check box subsets) that are mutually exclusive of some subsets, but not exclusive of others (i.e., the button in the same group as the check box subset in question).

Another illustration of the hybrid item list GUI control of the present invention is illustrated in FIG. 11. These examples demonstrate how the techniques of the present invention overcome the problems and disadvantages described above in relation to FIGS. 5–8. Recall that the conventional GUI shown in FIG. 6 allows the user to make inconsistent and ambiguous database selections. If one is limited to conventional GUI controls, then unambiguous and self-consistent selections can only be guaranteed by using the long and cumbersome radio button list shown in FIG. 8. An intuitive GUI control according to the present invention, however, is both easy to use and guarantees self-consistent and unambiguous database selections. As illustrated in FIG. 11, the items in the hybrid GUI control are partitioned into two subsets. A first subset 110 contains four check boxes allowing the user to independently select items "US Patents", "Japanese Patents", "European Patents", and "PCT Patent Publications". A second subset 112 contains a single item "All of the above". The first subset 110 and the second subset 112 are mutually exclusive, although in a different sense from example discussed in relation with FIG. 9. In particular, if the "All of the above" item is selected in subset 112, all the items in subset 110 are automatically selected as well. Conversely, if any item in subset 110 is de-selected, then the "All of the above" item in subset 112 is automatically de-selected as well. In other words, the selection of items in subset 112 is mutually exclusive with respect to the de-selection of items in subset 110. By reversing the meaning of selection and de-selection in one subset, this behavior is identical to the mutually exclusive behavior described in relation to FIG. 9. Therefore, the subsets are said to be mutually exclusive in this case as well.

More generally, two subsets A and B of any hybrid list are understood in the context of the present invention to be "mutually exclusive" when any selection of items in subset A other than a first predetermined combination, is exclusive of any selection of items in subset B other than a second predetermined combination. For example, if both the first and second predetermined combinations correspond to the selection of no items, then the term "mutually exclusive" recovers its simplest meaning as used in relation to FIG. 9. Alternatively, the term "mutually exclusive" takes on the meaning used in relation to FIG. 11 when the first predetermined combination (associated with subset 110) corresponds to the selection of all items, while the second predetermined combination (associated with subset 112) corresponds to the selection of no item. In some cases it may be useful for one of the predetermined combinations to correspond with a combination of selected and de-selected items. For example, FIG. 12 illustrates a variation on the hybrid list GUI control shown in FIG. 11. The first subset 120 in the list contains the same items as the first subset in the list of FIG. 11. The second subset 122, however, has an item for "All but PCT" rather than "All of the above". In this case, the selection of the check box "All but PCT" in the second subset 122 is mutually exclusive with respect to any selection of the check boxes in the first subset 120 other than the predetermined combination corresponding to the selection of US patents, Japanese patents, European patents, and not PCT patent publications.

The hybrid list GUI controls described above may be implemented on a wide variety of computer or electronic devices that conventionally employ graphical user interfaces. Although the invention is not limited to any particular hardware system, a system used for a typical implementation is shown in FIG. 13. A computer 130 includes a central processing unit 132, data bus 134, ROM 136, and RAM 138. The system also includes I/O devices such as a visual display 140, a keyboard 142, and a pointing device 144. As is the case with other graphical user interface controls, the GUI control of the present invention is typically stored as computer instruction code in the RAM 138 or ROM 136 for execution by the processor 132. The particular type of code will typically depend on the specific processor used, although the code may be machine-independent code that is executed by a virtual machine running on the processor. In a preferred embodiment, the code takes the form of an executable module that is part of a code library, so that the module is available for use by a number of diverse applications. Based on the detailed description provided above, the hybrid GUI control can be implemented using standard techniques and commercial software development tools. For example, the present invention may be implemented using the C++ programming language, Java script, or DHTML scripts. The invention is expected to be particularly useful in the case of GUI controls commonly used in web browser application programs, database programs, and other programs that benefit from intuitive user interfaces that enforce the accurate and efficient entry of information.

One of ordinary skill in the art will now appreciate that the present invention provides a method and system for providing improved controls in a graphical user interface. Although the present invention has been shown and described with reference to a preferred embodiment, equivalent alterations and modifications will occur to those skilled in the art upon reading and understanding this specification. The present invention includes all such equivalent alterations and modifications and is limited only by the scope of the following claims.

What is claimed is:

1. A method for providing a graphical user interface between a computer and a user to select options within a plurality of mutually exclusive subsets, the method comprising the computer-implemented steps of:
   a) displaying on a computer display a set of selectable items, wherein the set of selectable items is partitioned into the plurality of mutually exclusive subsets, wherein at least one of the plurality of mutually exclusive subsets contains multiple items, wherein the multiple items in each one of the at least one of the plurality of mutually exclusive subsets are mutually non-exclusive;
   b) receiving input specifying a user-specified item in the displayed set of selectable items;
   c) altering a setting of the user-specified item;
   d) if the user-specified item is contained in a subset A of the set of selectable items, then preserving settings of any items in subset A other than the user-specified item, and automatically altering settings of items in a subset B of the set of selectable items to ensure that settings of items in the subset A other than a predetermined combination of settings in subset A are exclusive of settings of items in the subset B other than a predetermined combination of settings in subset B; and
   e) displaying on the computer display the set of selectable items having altered settings.

2. The method of claim 1 wherein the predetermined combination of settings in subset A corresponds to a de-selection of all items in subset A.

3. The method of claim 1 wherein the predetermined combination of settings in subset B corresponds to a de-selection of all items in subset B.

4. The method of claim 1 further comprising the step of: if the user-specified item is contained in a subset B of the set of selectable items, then preserving settings of any items in subset B other than the user-specified item, and automatically altering settings of items in a subset A of the set of selectable items to ensure that settings of items in a subset A other than a predetermined combination of settings in subset A are exclusive of settings of items in a subset B other than a predetermined combination of settings in subset B.

5. The method of claim 1 wherein displaying on the computer display the set of selectable items comprises displaying, for each item in the set of selectable items, a check box and a text descriptor.

6. A method for providing a graphical user interface between a computer and a user to select options within mutually exclusive subsets, the method comprising the computer-implemented steps of:
   a) displaying on a computer display a set of selectable items, wherein the set of selectable items is partitioned into a subset A containing multiple items, and a subset B containing one item, wherein the subset A is mutually exclusive from the subset B, wherein the multiple items in the subset A are not mutually exclusive, and wherein the multiple items in the subset B are not mutually exclusive;
   b) receiving input specifying a user-specified item in the displayed set of selectable items;
   c) altering a setting of the user-specified item;
   d) if the user-specified item is contained in the subset A, then preserving settings of all items in subset A other than the user-specified item, and altering a setting of the item in subset B to ensure that the item in subset B has a selected setting if and only if all items in subset A have a selected setting;
   e) if the user-specified item is the one item in subset B, then altering settings of the items in subset A to ensure that the item in subset B has a selected setting if and only if all items in subset A have a selected setting; and
   e) displaying on the computer display the set of selectable items having altered settings.

* * * * *